United States Patent [19]
Lawson et al.

[11] Patent Number: 5,449,879
[45] Date of Patent: Sep. 12, 1995

[54] LASER BEAM DELIVERY SYSTEM FOR HEAT TREATING WORK SURFACES

[75] Inventors: William E. Lawson, Somerset, Wis.; R. Olen Lund, Paonia, Colo.

[73] Assignee: Laser Machining, Inc., Somerset, Wis.

[21] Appl. No.: 133,559

[22] Filed: Oct. 7, 1993

[51] Int. Cl.$^6$ ............................................. B23K 26/06
[52] U.S. Cl. ................................ 219/121.74; 148/565
[58] Field of Search .......... 219/121.6, 211.74, 121.82, 219/121.8, 121.69, 121.78; 148/565

[56] References Cited

U.S. PATENT DOCUMENTS

| | | | |
|---|---|---|---|
| 3,797,908 | 10/1974 | Ward et al. | 350/7 |
| 3,848,104 | 11/1974 | Locke | 148/565 |
| 3,866,032 | 2/1975 | Veres | 240/1.2 |
| 4,006,970 | 2/1977 | Slater et al. | 350/285 |
| 4,044,936 | 8/1977 | Obersby et al. | 219/121.74 |
| 4,174,154 | 1/1979 | Kawasaki | 219/121.6 |
| 4,196,461 | 3/1979 | Geary | 362/259 |
| 4,328,410 | 5/1982 | Slivinsky et al. | 215/121.69 |
| 4,367,017 | 1/1983 | Jimbou et al. | 350/486 |
| 4,456,811 | 6/1984 | Hella et al. | 219/121.74 |
| 4,480,169 | 10/1984 | Macken | 219/121.74 |
| 4,527,043 | 7/1985 | Hashiura et al. | 219/121.74 |
| 4,797,532 | 1/1989 | Maiorov | 215/121.78 |
| 4,969,722 | 11/1990 | Akeel | 350/484 |
| 5,096,511 | 3/1992 | Fetting | 148/565 |

FOREIGN PATENT DOCUMENTS

| | | | |
|---|---|---|---|
| 62-109924 | 5/1987 | Japan | 148/565 |
| 4-210883 | 7/1992 | Japan | 219/121.6 |
| 5-51627 | 3/1993 | Japan | 219/121.74 |

OTHER PUBLICATIONS

Ole A. Sandven, *Laser Surface Transformation Hardening*, AWS Conference New Orleans, LA. Apr. 14–15, 1988, pp. 8 and 34.

*Product Update: LMI's Laser Graver, Applications in Engraving for the Laser Graver, Product Review: Laser Machining, Inc.'s E–50 Laser-Graver*, reprinted from "The Engravers Journal", Mar./Apr. 1985, May/Jun. 1985 and Nov./Dec. 1987.

Shawn Waggoner, *Laser Engraving—High Tech Worth its High Price*, May/Jun. 1988, pp. 71–73.

*Primary Examiner*—Geoffrey S. Evans
*Attorney, Agent, or Firm*—Kinney & Lange

[57] ABSTRACT

A laser beam delivery system transmits a laser beam with sufficient power to heat treat a work surface. The laser beam is reflected and focused by a first reflector to a second reflector and then onto the work surface. The second reflector is mounted angularly to a rotatable shaft such that when the shaft is rotated, the second reflector rotates about a first optical axis which is separate from a second axis or shaft and at a frequency that produces an integrated energy ring that remains coupled.

13 Claims, 4 Drawing Sheets

_5,449,879_

LASER BEAM DELIVERY SYSTEM FOR HEAT TREATING WORK SURFACES

BACKGROUND OF THE INVENTION

The invention relates generally to laser devices and more particularly to a laser device for heat treating metals or other work surfaces.

The benefits of using an integrated laser beam to heat treat metal surfaces are known in the art. The integrated laser beam averages the energy from the laser beam over a treated surface. The averaged energy distribution thereby avoids back tempering that softens and weakens the treated surface.

In addition, the present integrators break the beam into many parts and focus the beams on an area that is typically rectangular. Even though it is possible to obtain a uniform spot using the present integrators, spatial coherence is destroyed because the spot is rectangular. Therefore, present segmented integrators cannot generate a uniform ring of heat.

Present laser beam integrators for cylindrical or conical surfaces use axicons or torroidal parabolas to focus the laser beam into a ring that heat treats metal surfaces. To obtain uniform energy distribution using the present integrators, the laser beam must be very symmetric. However, the high power lasers used for heat treating generally produce unsymmetrical and unstable beams.

There are many different ways of delivering a laser beam to a treated surface. The Akeel U.S. Pat. No. 4,969,722 discloses a device for delivering a collimated laser beam. A focusing lens is rotatable about an axis that is offset from a focal axis of the lens. The rotation of the lens causes a laser beam to trace a curve on a workpiece.

The Jimbou et al U.S. Pat. No. 4,367,017 discloses a laser beam reflection system for applying a laser beam to an area to be treated. This invention includes a set of reflective mirrors mounted in a welding head housing. The welding head housing is adapted to rotate about an axis such that the laser beam focused by a focusing mirror can be applied in a circular welding zone.

The Geary U.S. Pat. No. 4,196,461 discloses a pattern generating entertainment device capable of producing a circular pattern of light. The circular light pattern is produced by a rotating mirror that is set off of perpendicular to its rotational axis.

The Ward et al U.S. Pat. No. 3,797,908 discloses an optical apparatus which provides a mechanism for reflecting an optical beam with a mirror onto a work surface using the mirror that is angularly movable about a rotational axis and about a direction perpendicular to the rotational axis. Thus, the angular movements of the mirror cause the beam to scan over the work surface.

SUMMARY OF THE INVENTION

The present invention includes a laser beam delivery system capable of handling sufficient power to heat treat metal. An energy source produces an energy beam that is reflected and focused by a first reflector to a second reflector. The second reflector reflects the energy beam onto a work surface.

The second reflector is mounted to a shaft that is attached to and rotated by a motor about a first rotational axis while the second reflector is rotated about a second rotational axis at a frequency to produce an integrated energy ring that remains coupled, wherein the temperature of the work surface remains high enough between sweeps of the laser beam such that the laser beam is not caused to be reflected off the surface.

DETAILED DESCRIPTION OF THE PREFERRED EMBODIMENTS

Figure 1:
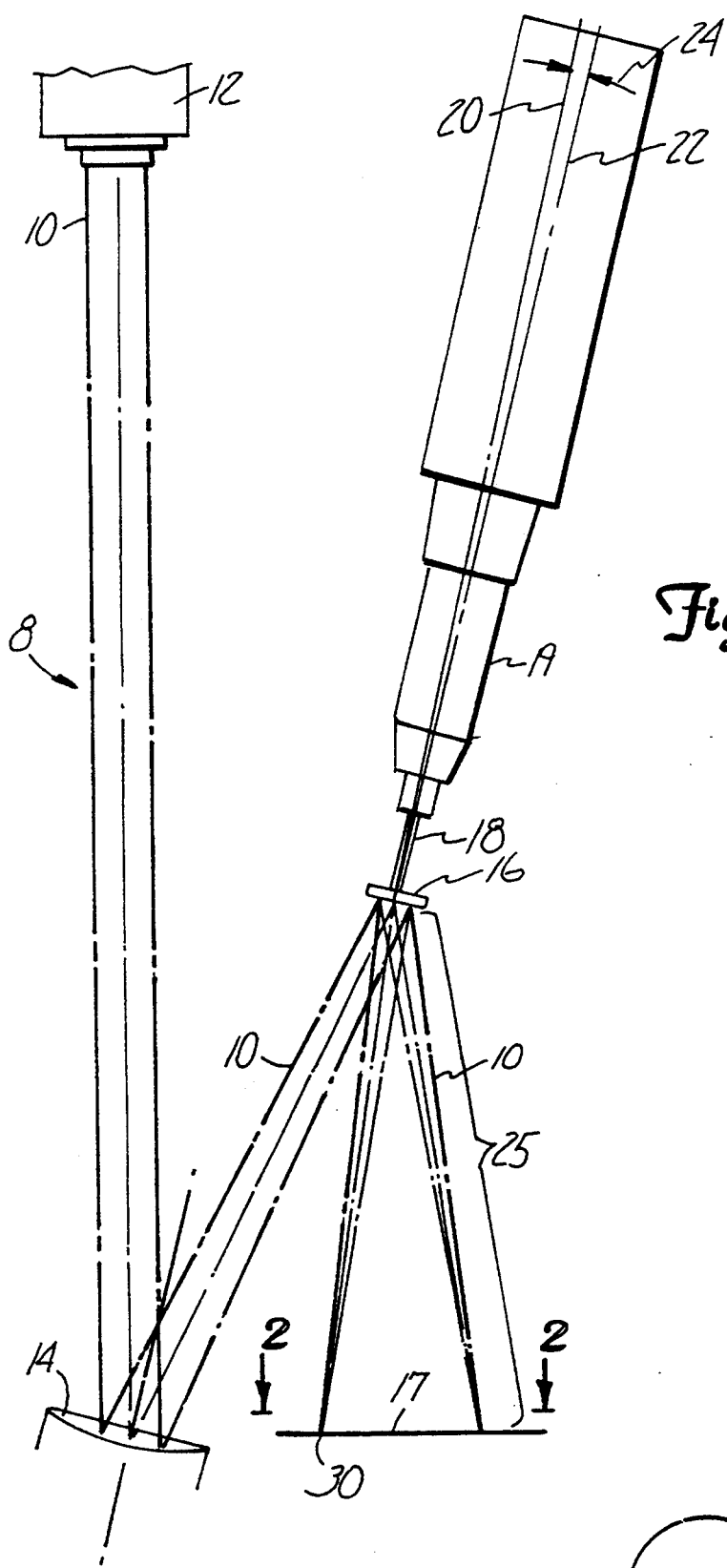
FIG. 1 is an elevation view of a lower beam delivery system for heat treating a circular ring on a flat work surface.

A laser beam delivery system of the present invention is generally illustrated at 8 in FIG. 1. The laser beam delivery system 8 is useful for heat treating a work surface. Like reference characters will be used for like elements throughout the drawings.

A laser beam 10 having sufficient power to heat treat metal is generated by a laser source 12 such as a $CO_2$ laser. A concave (focusing) mirror 14 reflects the laser beam 10 toward a flat mirror 16. The flat mirror 16 then reflects the laser beam 10 toward a work surface 17. The concave mirror 14 and the flat mirror 16 must be highly reflective and suitable for use with high power lasers. Such mirrors are typically constructed from copper, aluminum, or molybdenum.

A shaft 18 is attached to and rotated by a motor 19 about a first rotational or shaft axis 20. The flat mirror 16 is mounted angularly to the shaft 18 and therefore rotates about a second rotational or optical axis 22. The angle 24 between the first rotational axis 20 and the second rotational axis 22 is preferably between 1° and 10°. Furthermore, the flat mirror 16 must be balanced such that the mirror 16 does not wobble or vibrate when spun at high frequencies such as 400 Hz. Preferable, the mirror rotates the shaft 18 at a frequency between 25 Hz and 400 Hz.

The mirror 16 is rotated at a rotational frequency such that the laser beam 10 remains coupled. Coupling occurs when the temperature of the work surface 17 remains high enough between sweeps of the laser beam 10 such that the laser beam 10 is not caused to be reflected off of the work surface 17. The minimum rotational frequency required depends in a large part on the conductivity of the metal that is being treated. For a lower conductivity metal, such as iron, a frequency as low as 25 Hz is sufficient for coupling of the laser beam. On the other hand, for higher conductivity metals, such as aluminum, a frequency range of between 100 Hz and 400 Hz is needed to keep the laser beam coupled.

Figure 2:
FIG. 2 is a plan view as seen from a line 2—2 of FIG. 1.

The angular mounting of the mirror and the rotation of the mirror produces a circularly integrated ring 30 of generally uniform energy as generally illustrated in FIG. 2. By integrated ring is meant that the laser beam at its focal point has a generally uniform cross-sectional energy distribution. A generally uniform cross-sectional energy distribution avoids soft spots in the treated metal, which would occur if the cross-section of the laser beam contained points of high or low energy. The diameter of the energy ring 30 may be altered by changing the angle 24 between the first rotational axis 20 and the second rotational axis 22 or by changing the distance 25 between the flat mirror 16 and the work surface 17 or by changing both the angle 24 and the distance 25.

Figure 3:
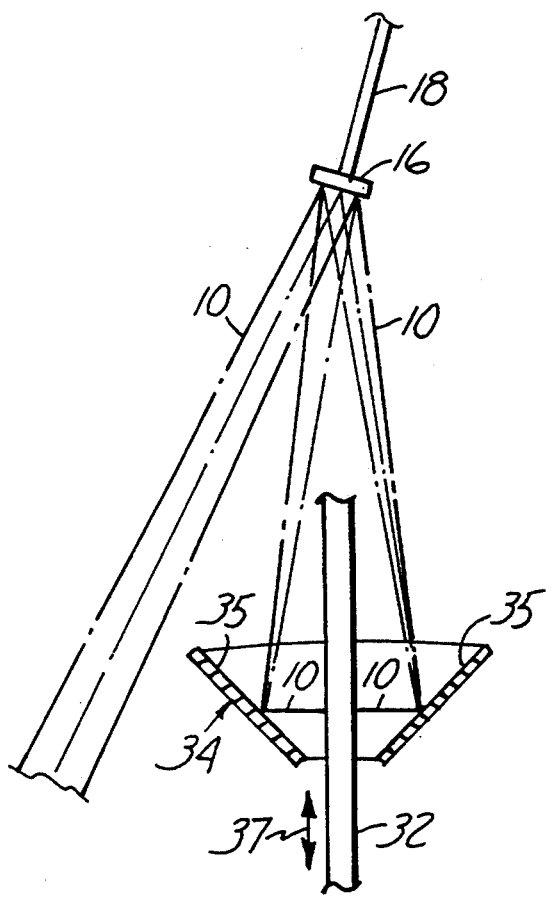
FIG. 3 is an elevation view of another embodiment of a laser beam delivery system for heat treating an outer surface of a shaft.

In another embodiment, the outer surface of a shaft 32 is heat treated as illustrated in FIG. 3. A reflective core or conical section 34 is fixedly mounted below the flat mirror 16. The angle of cone 34 is such that the focusing beam 10 impinges perpendicularly on a work surface of the shaft 32. The laser beam 10 is generated by the laser source 12 (not shown) and reflected off the concave mirror 14 (not shown) or a flat mirror (not shown). The laser beam 10 then reflects off the flat mirror 16, which is rotatably mounted on the shaft 18. Finally the laser beam 10 reflects off of an inner surface 35 of the reflective conical parabola 34 and onto the outer surface of the shaft 32. Similar to the embodiment of FIGS. 1 and 2, the flat mirror 16, shown in FIG. 3, is mounted on the shaft 18 such that it rotates about a first rotational or optical axis that is angularly disposed to a second rotational or shaft axis.

To heat treat the remainder of the outer surface of the shaft, preferably the shaft 32 is moved transverse to the laser beam that is reflected off of the conical section 34 in the general direction indicated by arrows 37. The conical section 34, like the concave mirror 14 and flat mirror 16, must be constructed from materials that are highly reflective and capable of withstanding damage from high power lasers. Furthermore, the conical section 34 may be cooled to dissipate excess heat. It should be noted that there is also a limited capability of moving the conical section 34 in the direction of arrows 37 to scan the beam 10 across the work surface of the shaft 32.

Figure 4:
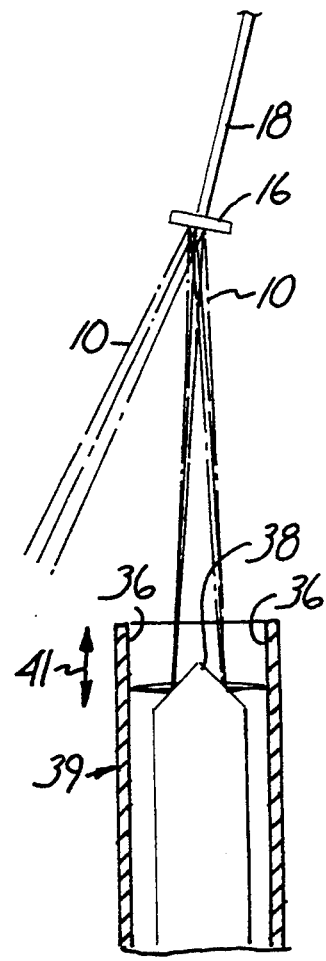
FIG. 4 is an elevation view of another embodiment of a laser beam delivery system for heat treating an interior tubular work surface.

In another embodiment, an inner surface 36 of a shaft 39 is heat treated as illustrated in FIG. 4. A reflective conical axicon or parabolic torroid 38 is preferably fixedly mounted below the flat mirror 16. The laser beam 10 is generated by the laser source 12 (not shown) and reflected off the concave mirror 14 (not shown) or flat mirror (not shown). The laser beam 10 then reflects off the flat mirror 16, which is rotatably mounted on the shaft 18 at an angle with respect to the second rotational or shaft axis. Finally the laser beam 10 reflects off of the outer surface of the reflective conical axicon 38 and onto the inner surface 36 of the shaft 39. Similar to the embodiment of FIGS. 1-3, the flat mirror 16 rotates about a first rotational or optical axis that is angularly disposed to the second rotational or shaft axis.

To heat treat the remainder of the inner surface 36 of the shaft 39, the shaft 39 is moved in the general direction indicated by arrows 41, perpendicular to the laser beam that is reflected off of the conical axicon 38. The conical axicon 38, like the concave mirror 14 and flat mirror 16 is constructed from materials that are highly reflective and capable of withstanding damage from high power lasers. Additionally, the conical axicon 38 may be cooled to dissipate excess heat.

Figure 5:
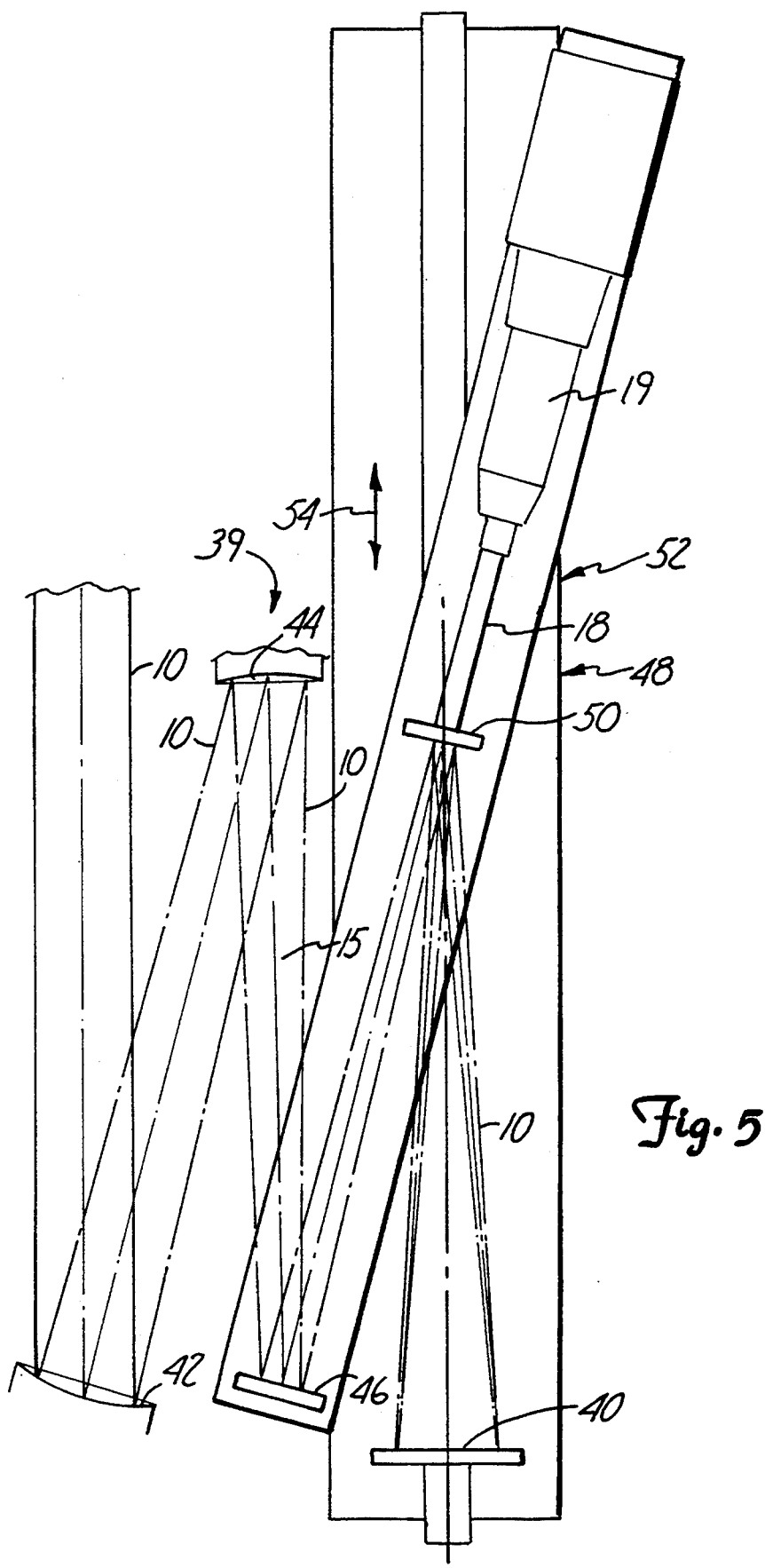
FIG. 5 is an elevation view of a device for heat treating an area on a flat surface.

In another embodiment of the laser beam delivery system, indicated generally at 39, an area of a work surface 40 is heat treated as illustrated in FIG. 5. A circular shaped laser beam does not readily lend itself to heat treating flat surfaces 40 because maintaining the laser beam in a constant diameter and moving the laser beam over the surface 40 would cause weak areas as a result of uneven heat treating. Referring to FIG. 5, a first concave mirror 42 and a second concave mirror 44 are fixedly mounted such that the mirrors 42 and 44 reflect the laser beam 10 towards a first flat mirror 46 that is mounted in a movable unit 48. The first flat mirror 46 reflects the laser beam 10 toward a second flat mirror 50. The second flat mirror 50 is rotatably mounted to the shaft 18 of the motor 19 which is also mounted in the movable unit 48. The second flat mirror 50 in turn then reflects the laser beam 10 onto the work surface 40. The portions of the laser beam 10 between the second concave mirror 44 and the first flat mirror 46 and the portion of the laser beam 10 between the second flat mirror 50 and the work surface 40 are parallel to each other. The portion of the laser beam 10 between the work surface 40 and the mirror 50 is perpendicular to the work surface 40.

The movable unit 48 is mounted preferably on a linear dove-tail slide 52. The linear dove-tail slide 52 permits the movable unit 48 to be adjusted in a direction indicated by arrows 54. Since the laser beam portions between the second concave mirror 44 and the first flat mirror 46 and between the second flat 50 and the work surface 40 are parallel to each other, the entire distance that the laser beam 10 travels between mirror 44 and the work surface 40 is constant regardless of the position of the movable unit 48. Maintaining the distance that the laser beam travels constant, retains the same focal point on the work surface 40 while also permitting the diameter of the focal point on the work surface 40 to be selectively varied.

Figure 6:
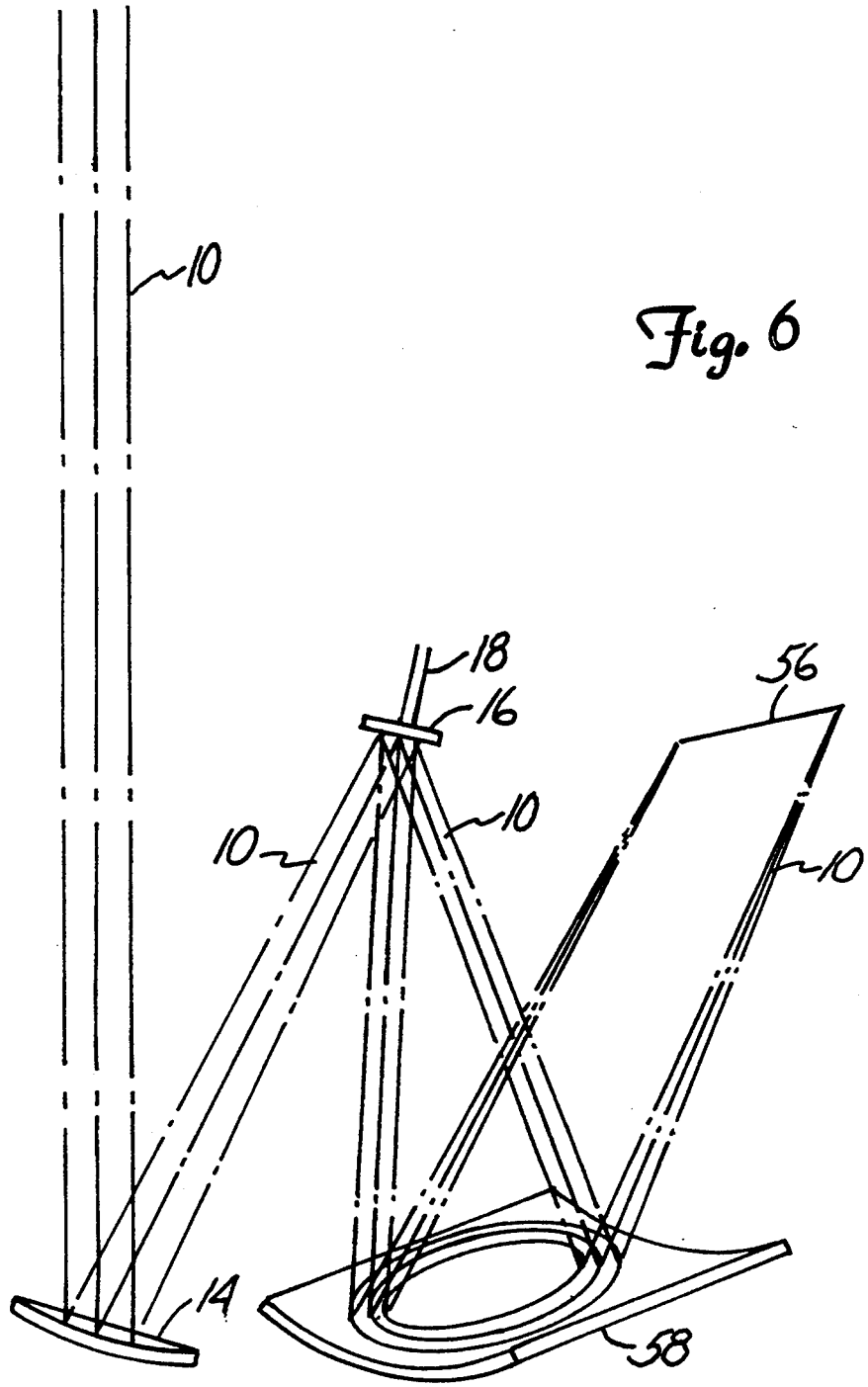
FIG. 6 is an elevation view of a device for heat treating a line on a flat surface.

In still another embodiment, the laser beam 10 is focused to create an integrated energy line 56 as illustrated in FIG. 6. A concave mirror 14 reflects the laser beam 10 toward a rotatably mounted flat mirror 16. The rotatably mounted flat mirror 16 is angularly mounted similar to the mirror 16 of FIGS. 1-4. The flat mirror 16 then reflects the laser beam 10 toward a cylindrical mirror 58. The cylindrical mirror 58 focuses the circular laser beam into a linear laser beam or energy line 56 that is uniform and integrated. Accordingly, back tempering, which makes heat treated surfaces softer and weaker because of uneven heat treating, is avoided.

Although the present invention has been described with reference to preferred embodiments, workers skilled in the art will recognize that changes may be made in form and detail without departing from the spirit and scope of the invention.

What is claimed is:

1. A heat treating device for heat treating a work surface comprising:
   an energy beam source for providing an energy beam to travel along a beam bath;
   a motor having a shaft, the shaft being rotatable about a first rotational axis;
   first reflective means positioned in the beam path for reflecting the energy beam;
   second reflective means positioned in the beam path for reflecting the energy beam, the second reflective means being attached to the shaft such that the beam is rotatable about a second rotational axis disposed at an angle from the first rotational axis, the energy beam reflecting off the first and second reflective means in the form of an energy ring and eventually striking the work surface;
   third reflective means having a cylindrical reflective surface for reflecting the energy beam from the second reflective means onto the work surface in the form of an energy line: and the shaft rotating the second reflective means at a frequency effective to maintain the energy beam coupled to work surface wherein the temperature of the work surface remains high enough between sweeps of the energy beam such that the energy beam is not reflected off the work surface.

2. The delivery system according to claim 1 wherein the energy beam is a laser beam.

3. The delivery system according to claim 1 wherein the first reflective means is a spherical concave mirror.

4. The delivery system according to claim 1 wherein the second reflective means is a flat mirror.

5. The delivery system according to claim 4 wherein the motor rotates the shaft at a frequency of 25 Hz to 400 Hz.

6. The delivery system according to claim 1 wherein the angle between the first rotational axis and the second rotational axis is between 1° and 10°.

7. The delivery system according to claim 1 wherein the first reflective means includes:

a first concave mirror.

8. The delivery system according to claim 7 wherein the second reflective means is a flat mirror positioned in the beam path for reflecting the energy beam from the first concave mirror to the third reflective means.

9. The delivery system according to claim 8 and further including:

a movable unit in which the flat mirror and the third reflective means are disposed at a fixed distance from each other.

10. A heat treating device for heat treating a work surface comprising:

an energy beam source for providing an energy beam to travel along a beam bath;

a motor having a shaft, the shaft being rotatable about a first rotational axis;

first reflective means positioned in the beam path for reflecting the energy beam;

second reflective means positioned in the beam path for reflecting the energy beam, the second reflective means being attached to the shaft such that the beam is rotatable about a second rotational axis disposed at an angle from the first rotational axis, the energy beam reflecting off the first and second reflective means in the form of an energy ring and eventually striking the work surface;

a linearly movable slide on which the motor and the second reflective means are mounted for linear movement thereon for adjusting the focal point of the energy beam on the work surface; and the shaft rotating the second reflective means at a frequency effective to maintain the energy beam coupled to work surface wherein the temperature of the work surface remains high enough between sweeps of the energy beam such that the energy beam is not reflected off the work surface.

11. The device of claim 10, further comprising a flat mirror positioned in the beam path between the first reflective means and the second reflective means for reflecting the energy beam from the first reflective means to the second reflective means, the flat mirror being positioned on the linearly movable slide at a fixed distance from the second reflective means while the slide is being moved.

12. The device of claim 10 wherein the angle between the first rotational axis and the second rotational axis is between 1° and 10°.

13. The device of claim 10 wherein the motor rotates the shaft and a frequency of 25 Hz to 400 Hz.

* * * * *